US010917826B2

(12) United States Patent
Jia et al.

(10) Patent No.: US 10,917,826 B2
(45) Date of Patent: Feb. 9, 2021

(54) PROCESSING APPARATUS AND METHOD FOR NETWORK INDICATION AND COMMUNICATIONS SYSTEM

(71) Applicant: FUJITSU LIMITED, Kawasaki (JP)

(72) Inventors: Meiyi Jia, Beijing (CN); Yulong Shi, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/920,950

(22) Filed: Mar. 14, 2018

(65) Prior Publication Data

US 2018/0206168 A1 Jul. 19, 2018

Related U.S. Application Data

(63) Continuation of application No. PCT/CN2015/089972, filed on Sep. 18, 2015.

(51) Int. Cl.
*H04W 36/22* (2009.01)
*H04W 48/18* (2009.01)
(Continued)

(52) U.S. Cl.
CPC .......... *H04W 36/22* (2013.01); *H04W 28/02* (2013.01); *H04W 36/0022* (2013.01); (Continued)

(58) Field of Classification Search
USPC ............... 370/331, 328, 332, 252, 310, 352
See application file for complete search history.

(56) References Cited

U.S. PATENT DOCUMENTS 8,457,636 B2   6/2013  Liu et al.
10,045,264 B2* 8/2018  Huang-Fu ......... H04W 36/0083
               (Continued)

FOREIGN PATENT DOCUMENTS

CN   103428822 A   12/2013
CN   103582124 A   2/2014
         (Continued)

OTHER PUBLICATIONS

International Search Report issued for International Patent Application No. PCT/CN2015/089972, dated Jun. 17, 2016. English translation attached.

(Continued)

*Primary Examiner* — Phuongchau Ba Nguyen
(74) *Attorney, Agent, or Firm* — Myers Wolin, LLC

(57) ABSTRACT

A processing apparatus and method for network indication and a communications system in a procedure of RC-IWK. The processing method includes: a base station determines whether UE context release indication contains information on a cause of release indicating that a traffic of a UE is steered from the LTE to the WLAN, when the UE context release indication transmitted by an MME; and initiates a connection reconfiguration procedure to the UE so that the UE is kept in a connected state, in a case where the UE context release indication contains the information on the cause of release indicating that the traffic of the UE is steered from the LTE to the WLAN. Hence, a case, for example, where the UE not expecting to use the LTE is steered to the LTE system again, will not occur.

11 Claims, 7 Drawing Sheets

(51) Int. Cl.
H04W 28/02 (2009.01)
H04W 76/38 (2018.01)
H04W 76/27 (2018.01)
H04W 36/00 (2009.01)

(52) U.S. Cl.
CPC ....... *H04W 36/0033* (2013.01); *H04W 48/18* (2013.01); *H04W 76/27* (2018.02); *H04W 76/38* (2018.02)

(56) References Cited

U.S. PATENT DOCUMENTS

| | | | |
|---|---|---|---|
| 10,111,162 B2* | 10/2018 | Chen | H04W 28/08 |
| 2015/0092665 A1* | 4/2015 | Choi | H04W 36/08 370/328 |
| 2016/0050605 A1 | 2/2016 | Kim et al. | |
| 2016/0277966 A1 | 9/2016 | Nagasaka et al. | |
| 2017/0215105 A1* | 7/2017 | Tan Bergstrom | H04W 24/02 |
| 2018/0206168 A1* | 7/2018 | Jia | H04W 28/02 |

FOREIGN PATENT DOCUMENTS

| | | |
|---|---|---|
| CN | 104105152 A | 10/2014 |
| CN | 104144453 A | 11/2014 |
| CN | 104584636 A | 4/2015 |
| WO | 2014/029075 A1 | 2/2014 |
| WO | 2014/157898 A1 | 10/2014 |
| WO | 2014 165832 A1 | 10/2014 |
| WO | 2014/181830 A1 | 11/2014 |
| WO | 2014/182611 A1 | 11/2014 |

OTHER PUBLICATIONS

Notice of Preliminary Rejection issued by the Korean Intellectual Property Office for corresponding Korean Patent Application No. 10-2018-7007750, dated Nov. 15, 2019, with an English translation.
Kyocera Corp., "Cause value in S1AP E-RAB Release Command message for WLAN offload", Agenda item: 15.3 3GPP TSG RAN WG3 Meeting #89, R3-151690, Beijing, China, Aug. 24-28, 2015.
Catt "Procedures of Interworking Enhancements", Agenda Item: 7.6.3, 3GPP TSG RAN WG2 Meeting #91, R2-153114, Beijing, China, Aug. 24-28, 2015.
Ericsson et al., "WLAN/3GPP Radio Interworking—More on Idle and Connected mode solution", Agenda Item: 5.1.1, 3GPP TSG-RAN WG2 #82, Tdoc R2-131886, Fukuoka, Japan, May 20-24, 2013.
The First Examination Report issued by the Patent Office of India for corresponding Indian Patent Application No. 201837008345, dated Jul. 6, 2020, with English translation.
3GPP TS 36.331 V12.5.0, "3rd Generation Partnership Project; Technical Specification Group Radio Access Network: Evolved Universal Terrestrial radio Access (E-UTRA); Radio resource Control (RRC); Protocol specification (Release 12)", Mar. 2015.
The extended European search report with supplementary European search report and the European search opinion issued by the European Patent Office for corresponding European Patent Application No. 15903885.0 dated Apr. 16, 2019.
Communication pursuant to Article 94(3) EPC issued by the European Patent Office for corresponding European Patent Application No. 15903885.0, dated Sep. 16, 2020.
Second Notification of Office Action and Search Report issued by the China National Intellectual Property Administration for corresponding Chinese patent application No. 201580082551.X dated Dec. 18, 2020, with English translation.
Ericsson, "RAN assistance parameter handing", Agenda item: 5.1, 3GPP TSG-RAN WG2 #87, R2-143320, Aug. 18-22, 2014, Dresden, Germany.
Intel Corporation, "Open issues of WLAN/3GPP radio interworking", Agenda item: 5.1.3, 3GPP TSG-RAN2#87, R2-143802, Aug. 18-22, 2014, Dresden, Germany.

* cited by examiner

PROCESSING APPARATUS AND METHOD FOR NETWORK INDICATION AND COMMUNICATIONS SYSTEM

CROSS REFERENCE TO RELATED APPLICATIONS

This application is a continuation application of International Application PCT/CN2015/089972 filed on Sep. 18, 2015, the entire contents of which are incorporated herein by reference.

TECHNICAL FIELD

This disclosure relates to the field of communications technologies, and in particular to a processing apparatus and method for network indication and a communications system in a procedure of network controlled long-term evolution (LTE)/wireless local area network (WLAN) interworking.

BACKGROUND

In the network-assisted LTE/WLAN interworking (which may be referred to as RA-IWK) in 3GPP R12, five possible use cases are captured, including the following three scenarios:

(1) a user equipment (UE) is within coverage of a radio access network (RAN) of LTE, and goes into coverage of a WLAN access point (AP) using the LTE;

(2) a UE is within overlapped coverage of the LTE RAN and the WLAN AP, and goes out of the WLAN AP coverage using the WLAN; and (3) a UE is within the overlapped coverage of the LTE RAN and the WLAN AP, all or a part of traffics of the UE are steered into the WLAN using the LTE.

Following agreements are made for the RA-IWK, for example, if a UE in a connected state (i.e., RRC_CONNECTED) in the LTE receives dedicated network indication (such as dedicated thresholds), the UE should apply the dedicated network indication, otherwise, the UE should apply common network indication (such as broadcasted thresholds); and when the UE is in an idle state (i.e., RRC_IDLE), the UE should maintain and apply the dedicated network indication within a period of time T after entering into the idle state, and thereafter, it should apply common network indication; the UE releases the dedicated network indication in handover or cell reselection; and the dedicated network indication is not provided during radio resource control (RRC) connection release (only provided by RRCConnectionReconfiguration).

In the network controlled LTE/WLAN interworking (which may be referred to as RC-IWK) in 3GPP R13, the dedicated network indication is also used as that in the RA-IWK. For example, a dedicated threshold (such as a payload) may be used, and based on the given threshold, the UE may find out a WLAN satisfying a condition according to a judgment condition identical to that of the RA-IWK; and furthermore, a newly-introduced dedicated message carrying a traffic steering (TS) command may be used, in which one or more target WLAN(s) will be directly indicated. For an R13 UE in an idle state, common network indication, dedicated network indication or a new dedicated TS command may be applied, which may be controlled by a network side, or may be dependent on the UE.

Following agreements are made for the RC-IWK, for example, a base station provides a UE with a group of APs (such as being identified by SSID, HDSSID, or BSSID, etc.), and a WLAM mobility mechanism applies these APs in supporting interworking, that is, the UE may move transparently to the base station; and the base station controls movement of the UE across groups based on, for example, a measurement report provided by the UE;

a WLAN mobility set is a set of one or more SSID/HDSSID/BSSIDs, and the movement of the UE between APs in the same WLAN mobility set is transparent relative to the base station, that is, the UE will not notify the base station of information on the movement in the WLAN mobility set; and all APs in the same WLAN mobility set share a WLAN termination (WT), which is taken as a termination of a control plane (CP) and a user plane (UP), and the UE is connected to at most one WLAN mobility set at any time point.

Differences between the RC-IWK and the RA-IWK include, for example, (1) tight network control is required in the RC-IWK;

(2) the new TS command in the RC-IWK may also be taken as network indication in a connected mode, that is, a UE in a connected state may possibly receive a dedicated threshold and/or the new TS command, including information on whether being offloaded to the WLAN and information on the target WLAN(s); and (3) besides the information on the target WLAN(s), the network indication may further include information on the WLAN mobility set.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a scenario where only a packet data network (PDN) connection is maintained between a packet data network gateway (P-GW) and a UE in the RC-IWK, or all PDN connections are to be steered to the WLAN, if an existing mechanism (such as the RA-IWK) is followed, the UE will be entered into an idle state after traffic steering is performed.

However, in the RC-IWK, it is possible that the UE enters into the connected state again (such as for the consideration of load balance by the base station), thereby resulting in a case, for example, where UE not expecting to use the LTE is steered to the LTE system again, even resulting in a case where some traffics of the UE are steered between the LTE and the WLAN back and forth, or a case where the UE is transferred between the idle state and the connected state back and forth, which will bring unnecessary signaling and traffic interruption, and lower network performance and users' experiences. Hence, problems that how to apply the RC-IWK mechanism and how to deal with network indication in the RC-IWK mechanism need to be solved.

Embodiments of this disclosure provide a processing apparatus and method for network indication and a communications system, to apply the RC-IWK mechanism and deal with network indication in the RC-IWK mechanism.

According to a first aspect of the embodiments of this disclosure, there is provided a processing method for network indication, applicable to RC-IWK, the processing method including:

determining by a base station whether user equipment (UE) context release indication contains information on a cause of release indicating that a traffic of a UE is steered from LTE to WLAN, when the base station receives the UE context release indication transmitted by a mobility management entity; and initiating a connection reconfiguration procedure by the base station to the UE so that the UE is kept in a connected state, in a case where the UE context release indication contains the information on the cause of release indicating that the traffic of the UE is steered from the LTE to the WLAN.

According to a second aspect of the embodiments of this disclosure, there is provided a processing apparatus for network indication, configured in a base station performing RC-IWK, the processing apparatus including:

a cause determining unit configured to, when UE context release indication transmitted by a mobility management entity is received, determine whether the UE context release indication contains information on a cause of release indicating that a traffic of UE is steered from LTE to WLAN; and a connection processing unit configured to, in a case where the UE context release indication contains the information on the cause of release indicating that the traffic of the UE is steered from the LTE to the WLAN, initiate a connection reconfiguration procedure to the UE, so that the UE is kept in a connected state.

According to a third aspect of the embodiments of this disclosure, there is provided a processing method for network indication, applicable to RC-IWK, the processing method including:

performing a connection reconfiguration procedure by a UE with a base station, so that the UE is kept in a connected state;

wherein the connection reconfiguration procedure is initiated by the base station in receiving UE context release indication transmitted by a mobility management entity, the UE context release indication containing information on a cause of release indicating that a traffic of the UE is steered from LTE to WLAN.

According to a fourth aspect of the embodiments of this disclosure, there is provided a processing apparatus for network indication, configured in a UE performing RC-IWK, the processing apparatus including:

a connection operating unit configured to perform a connection reconfiguration procedure with a base station, so that the UE is kept in a connected state;

wherein the connection reconfiguration procedure is initiated by the base station in receiving UE context release indication transmitted by a mobility management entity, the UE context release indication containing information on a cause of release indicating that a traffic of the UE is steered from the LTE to the WLAN.

According to a fifth aspect of the embodiments of this disclosure, there is provided a communications system, configured to perform RC-IWK, the communications system including:

a base station configured to, in receiving UE context release indication transmitted by a mobility management entity, determine whether the UE context release indication contains information on a cause of release indicating that a traffic of a UE is steered from the LTE to the WLAN, and in a case where the UE context release indication contains the information on the cause of release indicating that the traffic of the UE is steered from the LTE to the WLAN, initiate a connection reconfiguration procedure to the UE, so that the UE is kept in a connected state; and the UE configured to perform connection reconfiguration procedure with the base station, to be kept in a connected state.

An advantage of the embodiments of this disclosure exists in that when the base station receives UE context release indication transmitted by a mobility management entity (MME), in a case where the UE context release indication contains the information on the cause of release indicating that the traffic of the UE is steered from the LTE to the WLAN, the base station makes the UE be kept (or maintained) in a connected state. Hence, problems that how to apply the RC-IWK mechanism and how to deal with network indication in the RC-IWK mechanism may be solved, and a case, for example, where the UE not expecting to use the LTE is steered to the LTE system again, will not occur.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of this disclosure provides a processing method for network indication, applicable to RC-IWK procedure, which shall be described from a base station side.

Figure 1:
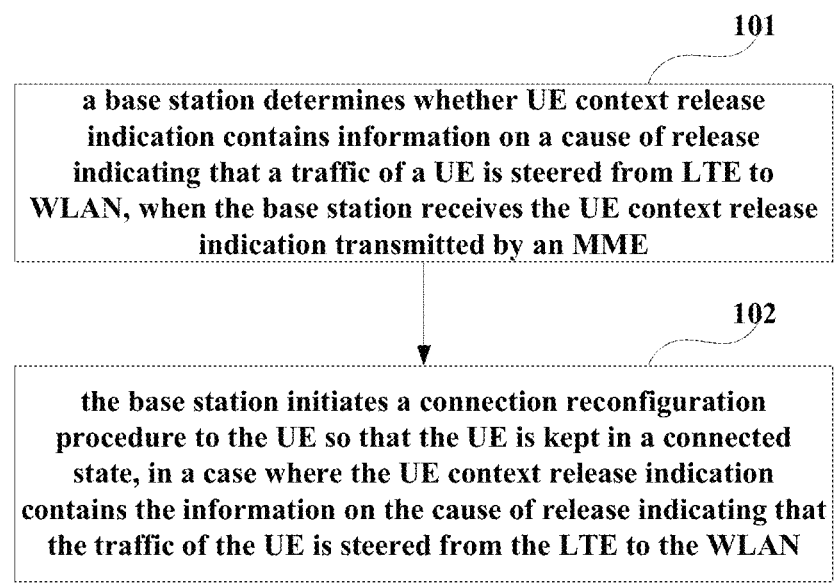
FIG. 1 is a flowchart of the processing method for network indication of Embodiment 1 of this disclosure.

FIG. 1 is a flowchart of the processing method for network indication of the embodiment of this disclosure. As shown in FIG. 1, the processing method for network indication includes:

Block 101: a base station determines whether UE context release indication contains information on a cause of release indicating that a traffic of a UE is steered from LTE to WLAN, when the base station receives the UE context release indication transmitted by a mobility management entity; and Block 102: the base station initiates a connection reconfiguration procedure to the UE so that the UE is kept in a connected state, in a case where the UE context release indication contains the information on the cause of release indicating that the traffic of the UE is steered from the LTE to the WLAN.

In this embodiment, what is different from the RA-IWK procedure is that if the UE context release indication transmitted by the MME of a core network contains the information on the cause of release "indicating that the traffic of the UE is steered from the LTE to the WLAN", even though the network detects that the UE has no traffic in the LTE for a long time or the MME indicates to release radio resource control (RRC) connection of the UE, the base station will not initiate an RRC connection release procedure, and may only initiate an RRC connection reconfiguration procedure, so that the UE is kept in the connected state.

In this embodiment, the UE context release indication may include a UE context release command message on an S1 interface (i.e., the UE CONTEXT RELEASE COMMAND message), and the information on a cause of release may include a cause value which indicates that the traffic is steered from the LTE to the WLAN and is added into the UE context release command message.

For example, a new cause value, such as "traffic offloading from LTE to WLAN", may be added into the UE context release command message on the S1 interface. Furthermore, new abnormal conditions may be added: capturing that the base station determines to reserve the RRC connection, proceeding with serving this UE, and not response to the UE context release command message.

However, this disclosure is not limited thereto. For example, the UE context release indication may be other messages; furthermore, the information on the cause of release may be expressed in other ways, etc., and a particular implementation may be determined according to an actual situation.

In this embodiment, only a signaling radio bearer (SRB) used for delivering a measurement report and/or subsequent dedicated network indication, such as an SRB1, may be maintained between the UE and the base station. Furthermore, an activation period in a discontinuous reception (DRX) mechanism of the UE may be configured to be greater than a predefined threshold, such as being configured to be greater than a value specified in an existing standard. Hence, the UE may use relatively long DRX, thereby saving energies.

Thus, when the UE context release indication contains the information on the cause of release indicating that the traffic of the UE is steered from the LTE to the WLAN, the UE is not permitted to enter into an idle state and is kept in the connected state, and a case, for example, where the UE not expecting to use the LTE is steered to the LTE system again, will not occur.

Figure 2:
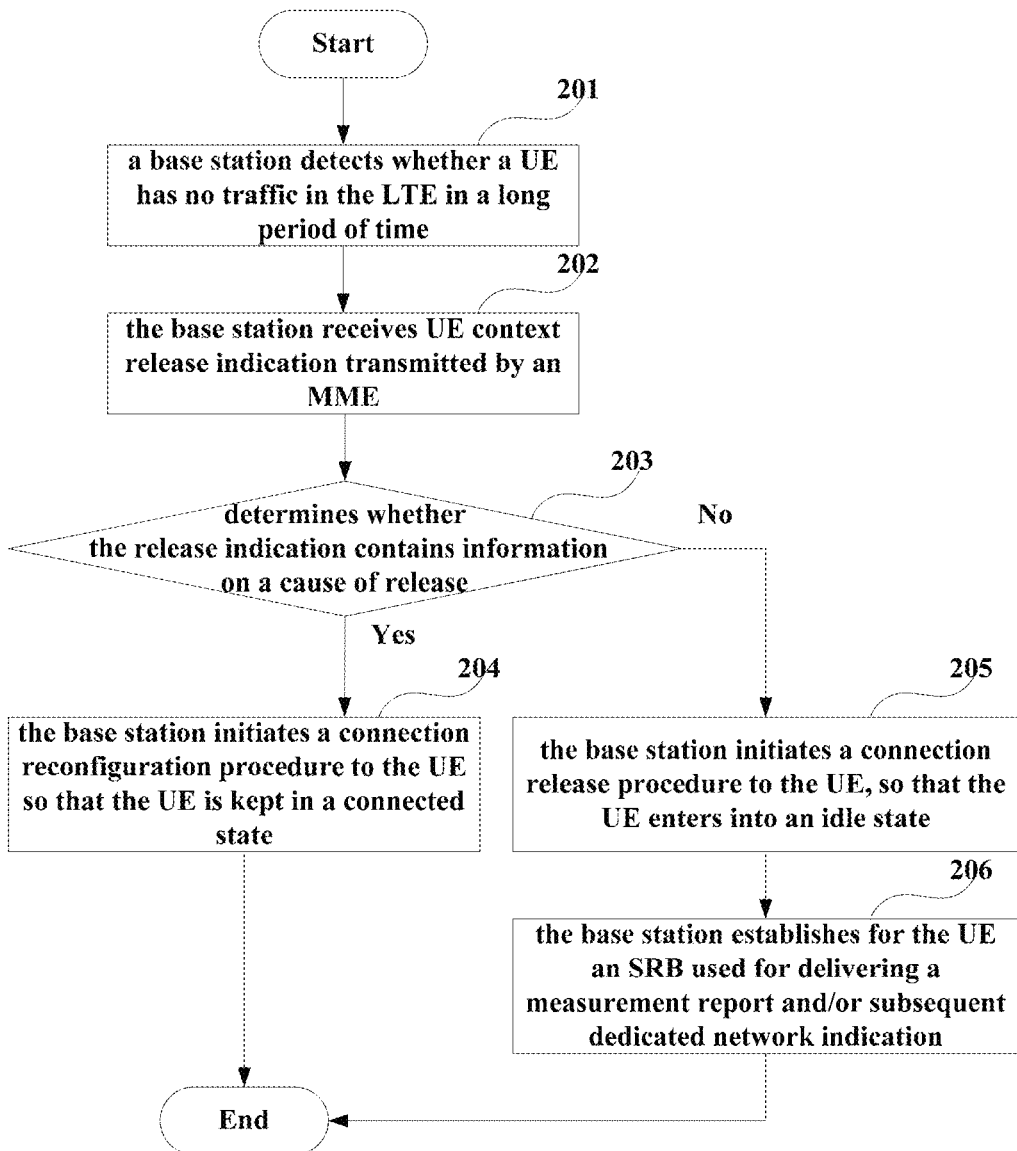
FIG. 2 is another flowchart of the processing method for network indication of Embodiment 1 of this disclosure.

FIG. 2 is another flowchart of the processing method for network indication of the embodiment of this disclosure. As shown in FIG. 2, the processing method for network indication includes:

Block 201: a base station detects whether a UE has no traffic in the LTE in a long period of time.

Block 202: the base station receives UE context release indication transmitted by an MME.

Block 203: the base station determines whether the UE context release indication contains information on a cause of release indicating that a traffic of the UE is steered from the LTE to the WLAN; entering block 204 when the information on a cause of release is contained, and entering block 205 when the information on a cause of release is not contained.

Block 204: the base station initiates a connection reconfiguration procedure to the UE, so that the UE is kept in a connected state;

in this embodiment, the base station may initiate the connection reconfiguration procedure to the UE only, but does not initiate an RRC connection release procedure, for example, the UE maintains the SRB1 only.

Block 205: the base station initiates a connection release procedure to the UE, so that the UE enters into an idle state;

in this embodiment, the base station may reuse an existing scheme after the UE enters into the idle state; and furthermore, the base station may establish the SRB1 for the UE if needed.

Block 206: the base station establishes for the UE an SRB used for delivering a measurement report and/or subsequent dedicated network indication.

In this embodiment, only the SRB1 may be established; the SRB1 is, for example, used for delivering a measurement report of the UE (or subsequent possible network indication), or is used for delivering new network indication (such as paging), etc.

For example, the establishment of the SRB1 may be initiated by the UE when the UE moves out of the WLAN mobility set or the UE reselects into a new cell, or may be initiated by the network (such as the base station) upon transmitting the new network indication. For example, an application stratum (AS, such as an RRC layer) of the UE may report to an upper layer (such as a non-access stratum), and the upper layer of the UE requests for establishing RRC connection and carries a cause for establishment, the cause for establishment being, for example, "integration with non-3 gpp RAT".

It can be seen from the above embodiment that when the base station receives the UE context release indication transmitted by the MME, in a case where the UE context release indication contains the information on the cause of release indicating that the traffic of the UE is steered from the LTE to the WLAN, the base station makes the UE be kept in a connected state. Hence, problems that how to apply the RC-IWK mechanism and how to deal with network indication in the RC-IWK mechanism may be solved, and a case, for example, where the UE not expecting to use the LTE is steered to the LTE system again, will not occur.

Embodiment 2

The embodiment of this disclosure provides a processing method for network indication, applicable to RC-IWK procedure, which shall be described from a UE side, with contents identical to those in Embodiment 1 being not going to be described herein any further.

Figure 3:
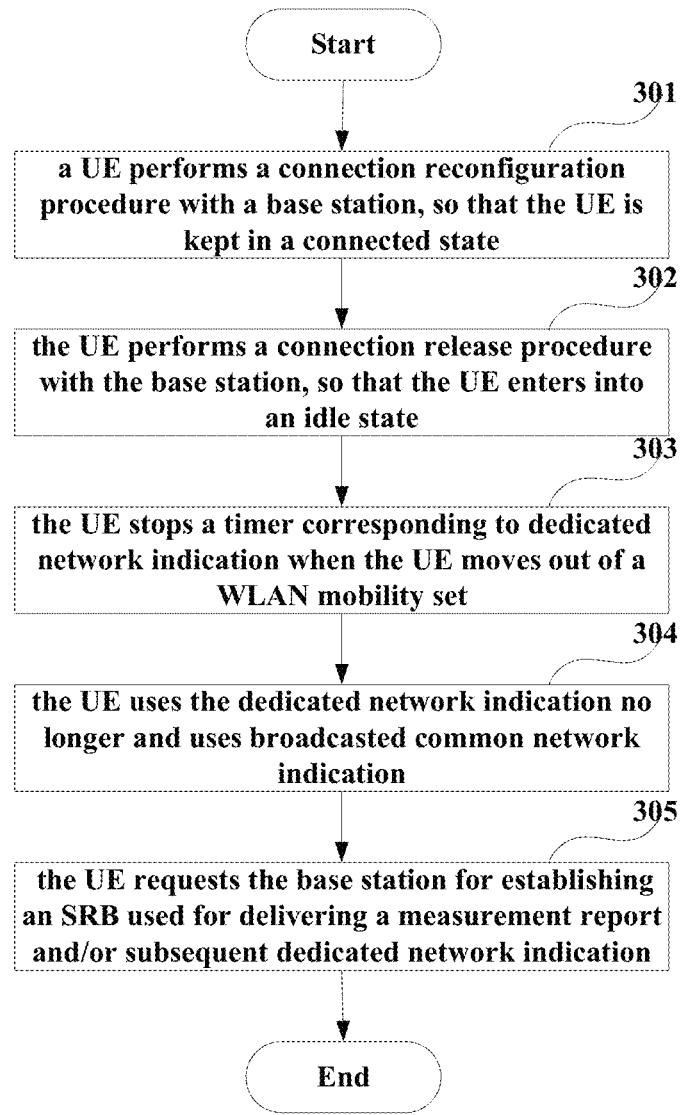
FIG. 3 is a flowchart of the processing method for network indication of Embodiment 2 of this disclosure.

FIG. 3 is a flowchart of the processing method for network indication of the embodiment of this disclosure. As shown in FIG. 3, the processing method for network indication includes: Block 301: a UE performs a connection reconfiguration procedure with a base station, so that the UE is kept in a connected state;

the connection reconfiguration procedure is initiated by the base station upon receiving UE context release indication transmitted by an MME, the UE context release indication containing information on a cause of release indicating that a traffic of the UE is steered from the LTE to the WLAN.

As shown in FIG. 3, the processing method for network indication may further include:

Block 302: the UE performs a connection release procedure with the base station, so that the UE enters into an idle state;

the connection release procedure is initiated by the base station in receiving the UE context release indication transmitted by the MME, the UE context release indication not containing the information on a cause of release indicating that the traffic is steered from the LTE to the WLAN.

As shown in FIG. 3, the processing method for network indication may further include:

Block 303: the UE stops a timer corresponding to dedicated network indication when the UE moves out of a WLAN mobility set, in this embodiment, the timer corresponding to dedicated network indication is, for example, a timer T350; however, this disclosure is not limited thereto; for example, it may be other new timers.

Block 304: the UE uses the dedicated network indication no longer and uses broadcasted common network indication, after stopping the timer corresponding to the dedicated network indication.

In this embodiment, a new trigger, such as "UE is moving out of the WLAN mobility set", may be added to stop the timer, such as a timer T350. Once the timer T350 is stopped, the UE uses the dedicated network indication (including a dedicated threshold or/and a TS command) no longer and uses the broadcasted common network indication.

As shown in FIG. 3, the processing method for network indication may further include:

Block 305: the UE requests the base station for establishing a signaling radio bearer used for delivering a measurement report and/or subsequent dedicated network indication;

in this embodiment, when the UE moves out of a WLAN mobility set, the UE may enter into the connected state from the idle state, and only the SRB1 is established for delivering a measurement report and subsequent possible dedicated network indication;

for example, when the UE moves out of a WLAN mobility set, an application stratum (AS, such as an RRC layer) of the UE may report to an upper layer (such as an NAS), and the upper layer of the UE requests for establishing RRC connection and carries a cause for establishment, the cause for establishment being, for example, "integration with non-3 gpp RAT".

Entering into the idle state from the connected state by the UE is described above, and in this embodiment, the UE may also be directly in the idle state, and the timer T350 is stopped when the UE moves out of the WLAN mobility set.

Figure 4:
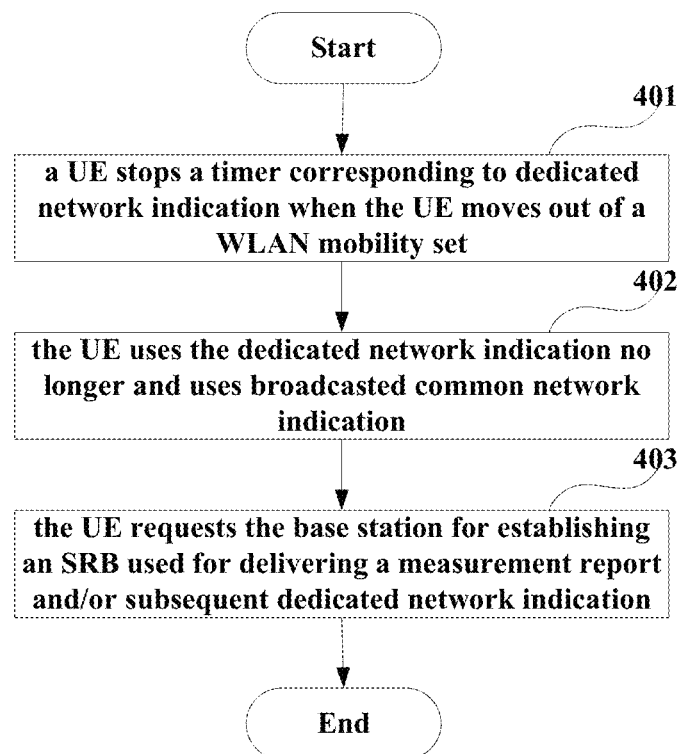
FIG. 4 is another flowchart of the processing method for network indication of Embodiment 2 of this disclosure.

FIG. 4 is another flowchart of the processing method for network indication of the embodiment of this disclosure. As shown in FIG. 4, the processing method for network indication includes:

Block 401: a UE stops a timer corresponding to dedicated network indication when the UE moves out of a WLAN mobility set.

Block 402: the UE uses the dedicated network indication no longer and uses broadcasted common network indication, after stopping the timer corresponding to the dedicated network indication.

As shown in FIG. 4, when the UE moves out of the WLAN mobility set, the processing method for network indication may further include:

Block 403: the UE requests the base station for establishing a signaling radio bearer used for delivering a measurement report and/or subsequent dedicated network indication, such as establishing the SRB1 only.

It can be seen from the above embodiment that when the UE moves out of the WLAN mobility set, the UE stops the timer, such as a timer T350, and/or establishes the SRB1 only. Hence, problems that how to apply the RC-IWK mechanism and how to deal with network indication in the RC-IWK mechanism may be solved, and a case, for example, where the UE not expecting to use the LTE is steered to the LTE system again, will not occur.

Embodiment 3

The embodiment of this disclosure provides a processing apparatus for network indication, configured in a base station performing RC-IWK, with contents identical to those in Embodiment 1 being not going to be described herein any further.

Figure 5:
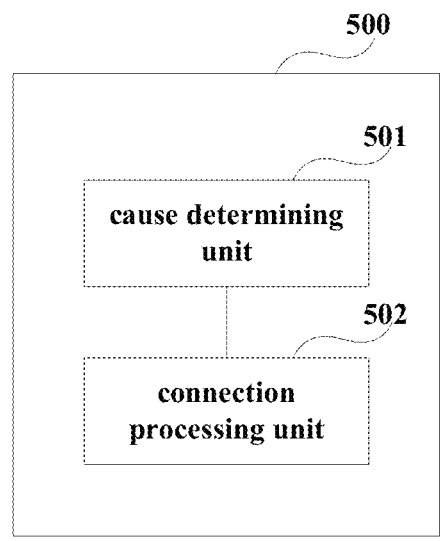
FIG. 5 is a schematic diagram of the processing apparatus for network indication of Embodiment 3 of this disclosure.

FIG. 5 is a schematic diagram of the processing apparatus for network indication of the embodiment of this disclosure. As shown in FIG. 5, the processing apparatus 500 includes:

a cause determining unit 501 configured to, when UE context release indication transmitted by an MME is received, determine whether the UE context release indication contains information on a cause of release indicating that a traffic of a UE is steered from LTE to WLAN; and a connection processing unit 502 configured to, in a case where the UE context release indication contains the information on the cause of release indicating that the traffic of the UE is steered from the LTE to the WLAN, initiate a connection reconfiguration procedure to the UE, so that the UE is kept in a connected state.

Figure 6:
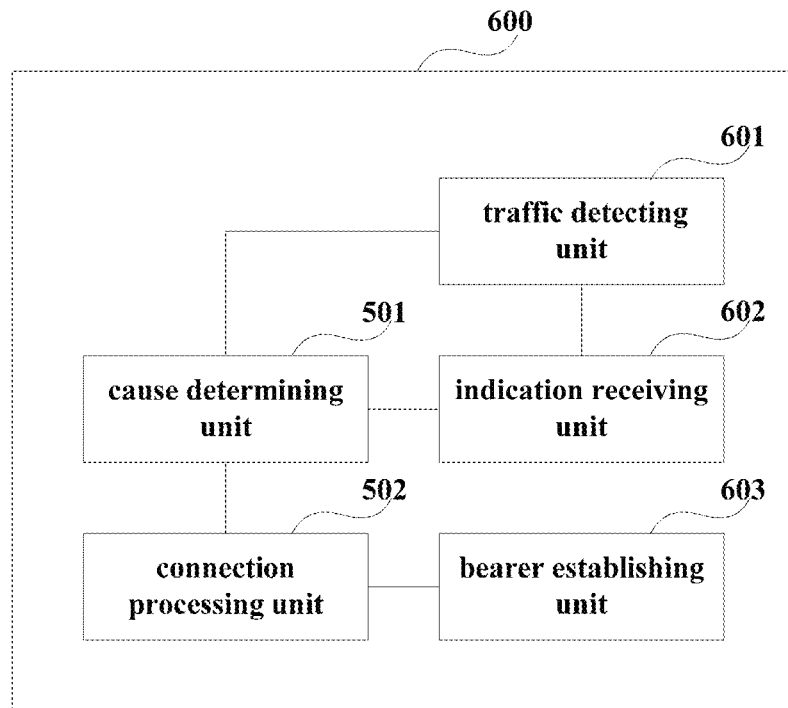
FIG. 6 is another schematic diagram of the processing apparatus for network indication of Embodiment 3 of this disclosure.

FIG. 6 is another schematic diagram of the processing apparatus for network indication of the embodiment of this disclosure. As shown in FIG. 6, the processing apparatus 600 includes a cause determining unit 501 and a connection processing unit 502, as described above.

As shown in FIG. 6, the processing apparatus 600 may further include:

a traffic detecting unit 601 configured to detect whether the UE has no traffic in the LTE in a long period of time; and an indication receiving unit 602 configured to receive the UE context release indication transmitted by the MME.

In this embodiment, the connection processing unit 502 may further be configured to maintain a signaling radio bearer of the UE used for delivering a measurement report and/or subsequent dedicated network indication, such as maintaining the SRB1 only.

In this embodiment, the connection processing unit 502 may further be configured to configure an activation period in a discontinuous reception mechanism of the UE to be greater than a predefined threshold.

In this embodiment, the UE context release indication may include a UE context release command message at an S1 interface, and the information on a cause of release may include a cause value which indicates that the traffic is steered from the LTE to the WLAN and is added into the UE context release command message.

In this embodiment, the connection processing unit 502 may further be configured to, in a case where the UE context release indication does not contain the information on the cause of release indicating that the traffic of the UE is steered from the LTE to the WLAN, initiate a connection release procedure to the UE, so that the UE enters into an idle state.

As shown in FIG. 6, the processing apparatus 600 may further include:

a bearer establishing unit 603 configured to establish a signaling radio bearer used for delivering a measurement report and/or subsequent dedicated network indication for the UE.

For example, the SRB1 is established only. The establishment of the signaling radio bearer is initiated by the UE in moving out of a WLAN mobility set or reselecting into a new cell, or is initiated by a network in transmitting new network indication.

The embodiment of this disclosure further provides a base station, configured with the above processing apparatus 500 or 600 for network indication.

Figure 7:
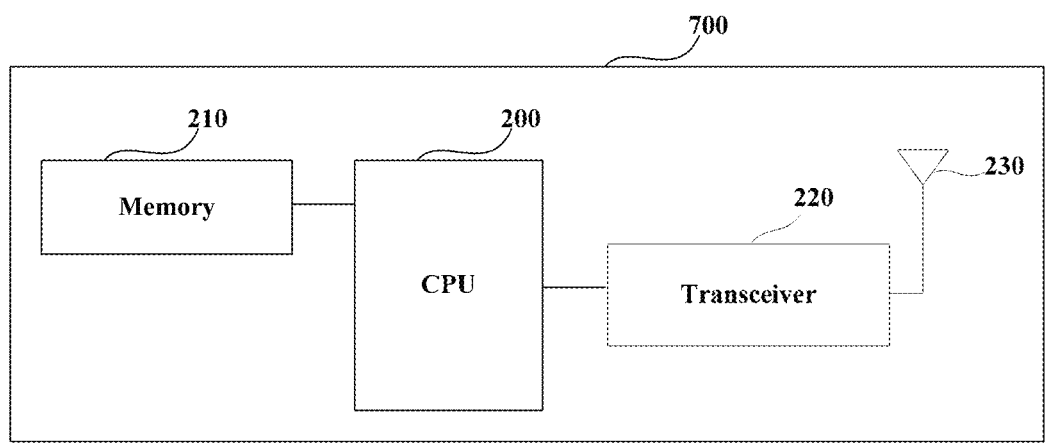
FIG. 7 is a schematic diagram of a structure of the base station of Embodiment 3 of this disclosure.

FIG. 7 is a schematic diagram of a structure of the base station of the embodiment of this disclosure. As shown in FIG. 7, the base station 700 may include a central processing unit (CPU) 200 and a memory 210, the memory 210 being coupled to the central processing unit 200. The memory 210 may store various data, and furthermore, it may store a program for information processing, and execute the program under control of the central processing unit 200.

For example, the base station 700 may carry out the processing method for network indication described in Embodiment 1, and the central processing unit 200 may be configured to carry out the functions of the processing apparatus 500 or 600 for network indication.

Furthermore, as shown in FIG. 7, the base station 700 may include a transceiver 220, and an antenna 230, etc. Functions of the above components are similar to those in the relevant art, and shall not be described herein any further. It should be noted that the base station 700 does not necessarily include all the parts shown in FIG. 7, and furthermore, the base station 700 may include parts not shown in FIG. 7, and the relevant art may be referred to.

It can be seen from the above embodiment that when the base station receives the UE context release indication transmitted by the MME, in a case where the UE context release indication contains the information on the cause of release indicating that the traffic of the UE is steered from the LTE to the WLAN, the base station makes the UE be kept in a connected state. Hence, problems that how to apply the RC-IWK mechanism and how to deal with network indication in the RC-IWK mechanism may be solved, and a case, for example, where the UE not expecting to use the LTE is steered to the LTE system again, will not occur.

Embodiment 4

The embodiment of this disclosure provides a processing apparatus for network indication, configured in a UE performing RC-IWK, with contents identical to those in Embodiment 2 being not going to be described herein any further.

Figure 8:
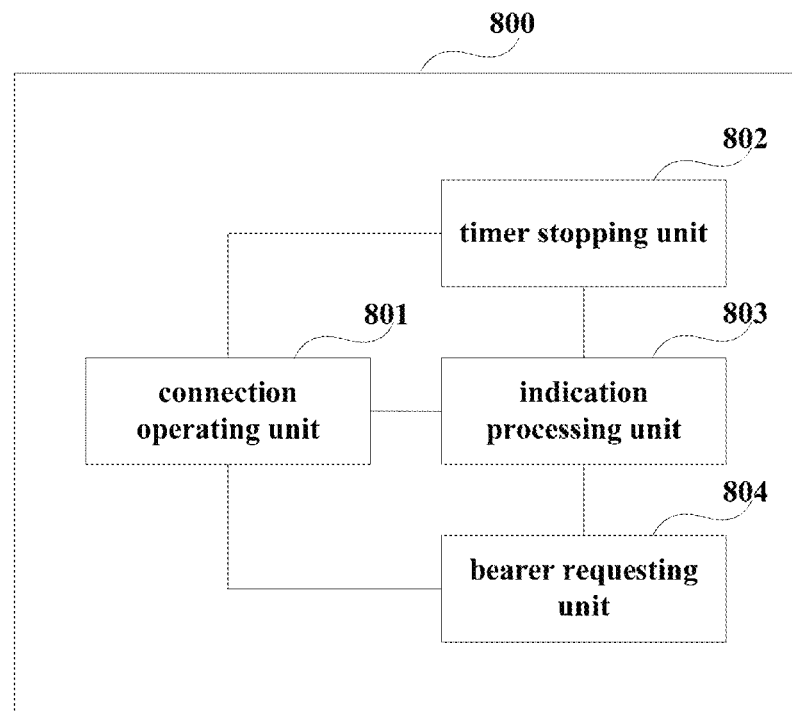
FIG. 8 is a schematic diagram of the processing apparatus for network indication of Embodiment 4 of this disclosure.

FIG. 8 is a schematic diagram of the processing apparatus for network indication of the embodiment of this disclosure. As shown in FIG. 8, the processing apparatus 800 includes:

a connection operating unit 801 configured to perform a connection reconfiguration procedure with a base station, so that the UE is kept in a connected state;

the connection reconfiguration procedure is initiated by the base station in receiving UE context release indication transmitted by an MME, the UE context release indication containing information on a cause of release indicating that a traffic of the UE is steered from the LTE to the WLAN, for example, the UE maintains the SRB1 only.

In this embodiment, the connection operating unit 801 may further be configured to perform a connection release procedure with the base station, so that the UE enters into an idle state;

and the connection release procedure is initiated by the base station in receiving the UE context release indication transmitted by the MME, the UE context release indication not containing the information on a cause of release indicating that the traffic is steered from the LTE to the WLAN.

As shown in FIG. 8, the processing apparatus 800 for network indication may further include:

a timer stopping unit 802 configured to stop a timer corresponding to dedicated network indication when the UE moves out of a WLAN mobility set.

As shown in FIG. 8, the processing apparatus 800 for network indication may further include:

an indication processing unit 803 configured to use the dedicated network indication no longer and use broadcasted common network indication after stopping the timer corresponding to the dedicated network indication.

In this embodiment, when the UE moves out of a WLAN mobility set, an application stratum of the UE may report to an upper layer, and the upper layer of the UE requests for establishing RRC connection and carries a cause for establishment.

As shown in FIG. 8, the processing apparatus 800 for network indication may further include:

a bearer requesting unit 804 configured to request the base station for establishing a signaling radio bearer used for delivering a measurement report and/or subsequent dedicated network indication, such as establishing the SRB1 only.

Figure 9:
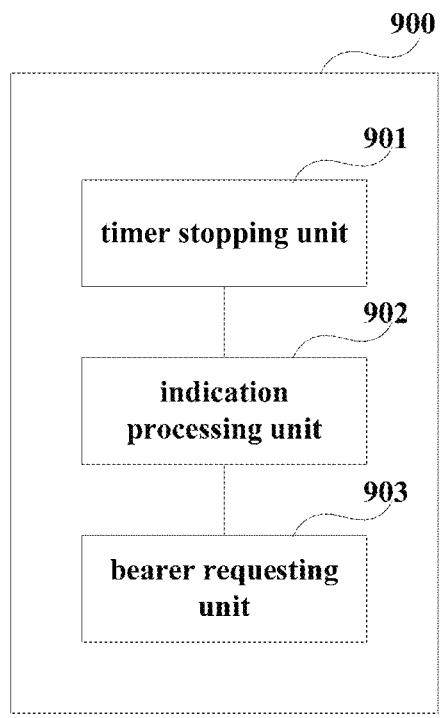
FIG. 9 is another schematic diagram of the processing apparatus for network indication of Embodiment 4 of this disclosure.

FIG. 9 is another schematic diagram of the processing apparatus for network indication of the embodiment of this disclosure. As shown in FIG. 9, the processing apparatus 900 for network indication includes:

a timer stopping unit 901 configured to stop a timer corresponding to dedicated network indication when the UE moves out of a WLAN mobility set.

As shown in FIG. 9, the processing apparatus 900 for network indication may further include:

an indication processing unit 902 configured to use the dedicated network indication no longer and use broadcasted common network indication after stopping the timer corresponding to the dedicated network indication.

In this embodiment, when the UE moves out of a WLAN mobility set, an application stratum of the UE may report to an upper layer, and the upper layer of the UE requests for establishing RRC connection and carries a cause for establishment.

As shown in FIG. 9, the processing apparatus 900 for network indication may further include:

a bearer requesting unit 903 configured to request the base station for establishing a signaling radio bearer used for delivering a measurement report and/or subsequent dedicated network indication when the UE moves out of a WLAN mobility set, such as establishing the SRB1 only.

The embodiment of this disclosure further provides a UE, configured with the above processing apparatus 800 or 900 for network indication.

Figure 10:
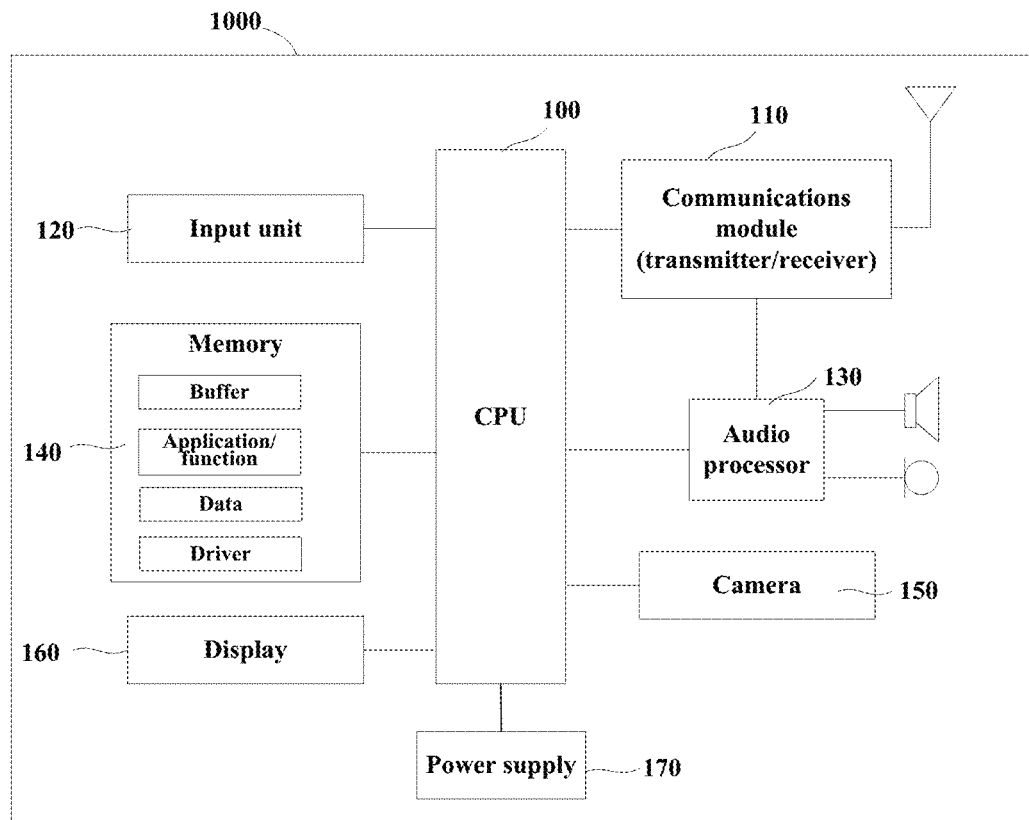
FIG. 10 is a schematic diagram of a structure of the UE of Embodiment 4 of this disclosure.

FIG. 10 is a schematic diagram of a structure of the UE of the embodiment of this disclosure. As shown in FIG. 10, the UE 1000 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the processing apparatus 800 or 900 for network indication may be integrated into the central processing unit 100. For example, the central processing unit 100 may be configured to carry out the processing method for network indication described in Embodiment 1.

In another implementation, the processing apparatus 800 or 900 for network indication and the central processing unit 100 may be configured separately. For example, the processing apparatus 800 or 900 for network indication may be configured as a chip connected to the central processing unit 100, with its functions being realized under control of the central processing unit 100.

As shown in FIG. 10, the UE 1000 may further include a communications module 110, an input unit 120, an audio processor 130, a memory 140, a camera 150, a display 160 and a power supply 170. Functions of the above components are similar to those in the relevant art, and shall not be described herein any further. It should be noted that the UE 1000 does not necessarily include all the parts shown in FIG. 10, and the above components are not necessary; and furthermore, the UE 1000 may include parts not shown in FIG. 10, and the relevant art may be referred to.

It can be seen from the above embodiment that when the UE moves out of the WLAN mobility set, the UE stops the timer, such as a timer T350, and/or establishes the SRB1 only. Hence, problems that how to apply the RC-IWK mechanism and how to deal with network indication in the RC-IWK mechanism may be solved, and a case, for example, where the UE not expecting to use the LTE is steered to the LTE system again, will not occur.

Embodiment 5

The embodiment of this disclosure provides a communications system, configured to perform RC-IWK, with contents identical to those in embodiments 1-4 being not going to be described herein any further.

Figure 11:
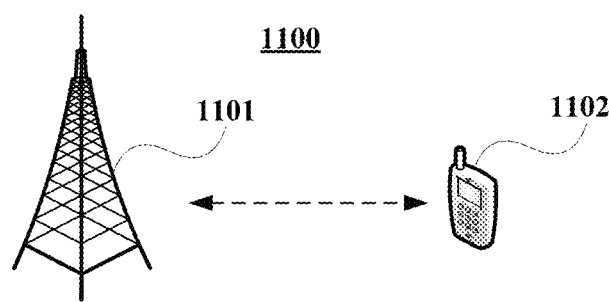
FIG. 11 is a schematic diagram of the communications system of Embodiment 5 of this disclosure.

FIG. 11 is a schematic diagram of the communications system of the embodiment of this disclosure. As shown in FIG. 11, the communications system 1100 includes a base station 1101 and a UE 1102.

In receiving UE context release indication transmitted by an MME, the base station 1101 determines whether the UE context release indication contains information on a cause of release indicating that a traffic of a UE is steered from the LTE to the WLAN, and in a case where the UE context release indication contains the information on the cause of release indicating that the traffic of the UE is steered from the LTE to the WLAN, initiates a connection reconfiguration procedure to the UE, so that the UE is kept in a connected state; and The UE 1102 performs connection reconfiguration procedure with the base station 1101, to be kept in a connected state. For example, an RRC connection reconfiguration procedure is only performed, and an RRC connection release procedure is not performed; and the UE 1102 only maintains the SRB1.

In this embodiment, the base station 1101 may further be configured to, in a case where the UE context release indication does not contain the information on the cause of release indicating that the traffic of the UE is steered from the LTE to the WLAN, initiate a connection release procedure to the UE, so that the UE enters into an idle state;

and the UE 1102 performs a connection release procedure with the base station 11, to enter into an idle state.

In this embodiment, the base station 1101 may further be configured to, when the UE 1102 moves out of a WLAN mobility set or reselects into a new cell, or new network indication is transmitted by a network, establish a signaling radio bearer used for delivering a measurement report and/or subsequent dedicated network indication for the UE 1102, such as establishing only the SRB1 for the UE 1102.

In this embodiment, the UE 1102 may further be configured to stop a timer corresponding to dedicated network indication when the UE 1102 moves out of the WLAN mobility set.

In this embodiment, the UE 1102 may further be configured to request the base station 1101 for establishing a signaling radio bearer used for delivering a measurement report and/or subsequent dedicated network indication when the UE moves out of the WLAN mobility set; for example, the UE 1102 requests for establishing only the SRB1.

An embodiment of the present disclosure provides a computer readable program code, which, when executed in a base station, will cause a computer unit to carry out the processing method for network indication described in Embodiment 1 in the base station.

An embodiment of the present disclosure provides a computer storage medium, including a computer readable program code, which will cause a computer unit to carry out the processing method for network indication described in Embodiment 1 in a base station.

An embodiment of the present disclosure provides a computer readable program code, which, when executed in a UE, will cause a computer unit to carry out the processing method for network indication described in Embodiment 2 in the UE.

An embodiment of the present disclosure provides a computer storage medium, including a computer readable program code, which will cause a computer unit to carry out the processing method for network indication described in Embodiment 2 in a UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communications combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A processing apparatus for network indication, the processing apparatus configured in a user equipment (UE) performing network controlled LTE/WLAN interworking, the processing apparatus comprising:
    a connection operator configured to perform a UE action of leaving a radio resource control connected state (RRC-CONNECTED) and apply a dedicated network configuration related to the network controlled LTE/WLAN interworking; and
    timer processor circuitry configured to stop a timer corresponding to the dedicated network indication if a WLAN connection fails or connection attempts to WLAN(s) fails by the UE.

2. The processing apparatus according to claim 1, wherein the dedicated network configuration related to the network controlled LTE/WLAN interworking comprises a WLAN mobility set.

3. The processing apparatus according to claim 1, wherein the processing apparatus further comprises:
    indication processor circuitry configured to use the dedicated network indication no longer and use a broadcasted common network indication after stopping the timer corresponding to the dedicated network indication.

4. The processing apparatus according to claim 1, wherein the processing apparatus further comprises:
    bearer requesting processor circuitry configured to request a base station to establish a signaling radio bearer used for delivering a measurement report and/or subsequent dedicated network indication when the UE moves out of a WLAN mobility set.

5. The processing apparatus according to claim 4, wherein when the UE moves out of the WLAN mobility set, an application stratum of the UE reports to an upper layer, and the upper layer of the UE requests an establishing of a connection and carries a cause of establishment.

6. A communications system, the communications system configured to perform network controlled LTE/WLAN interworking, the communications system comprising:
    a user equipment (UE) configured to perform a UE action of leaving a radio resource control connected state (RRC-CONNECTED) and apply a dedicated network configuration, the dedicated network configuration is related to the network controlled LTE/WLAN interworking; and
    the UE configured to stop a timer corresponding to the dedicated network indication if a WLAN connection fails or connection attempts to WLAN(s) fails by the UE.

7. The communications system according to claim 6, wherein the dedicated network configuration related to the network controlled LTE/WLAN interworking comprises a WLAN mobility set.

8. The communications system according to claim 6, wherein the processing apparatus further comprises:
    indication processor circuitry configured to use the dedicated network indication no longer and use a broadcasted common network indication after stopping the timer corresponding to the dedicated network indication.

9. A processing apparatus for network indication, the processing apparatus configured in a user equipment (UE), the UE performing network controlled LTE/WLAN interworking, the processing apparatus comprising:
    a memory and processor circuitry, the processor circuitry configured to
        perform a UE action of leaving a radio resource control connected state (RRC-CONNECTED) and apply a dedicated network configuration, the dedicated network configuration is related to the network controlled LTE/WLAN interworking, and
        to stop a timer corresponding to the dedicated network indication if a WLAN connection fails or connection attempts to WLAN(s) fails by the UE.

10. The processing apparatus according to claim 9, wherein the dedicated network configuration related to the network controlled LTE/WLAN interworking comprises a WLAN mobility set and the connection attempts to WLAN (s) inside the WLAN mobility set.

11. The processing apparatus according to claim 9, wherein the processing apparatus further comprises:
    the processor circuitry further configured to stop using the dedicated network indication and use a broadcasted common network indication after stopping the timer corresponding to the dedicated network indication.

* * * * *